May 3, 1960 H. E. RAILSBACK 2,935,109
HEAT-SEALABLE LININGS FOR PNEUMATIC TIRES AND THE LIKE
Filed Jan. 25, 1957

INVENTOR.
H.E. RAILSBACK

BY *Hudson & Young*

ATTORNEYS

United States Patent Office 2,935,109
Patented May 3, 1960

2,935,109

HEAT-SEALABLE LININGS FOR PNEUMATIC TIRES AND THE LIKE

Henry E. Railsback, Phillips, Tex., assignor to Phillips Petroleum Company, a corporation of Delaware Application January 25, 1957, Serial No. 636,265

9 Claims. (Cl. 152—347)

This invention relates to improved self-sealing linings which can be used in pneumatic tires, tubes and the like. In another aspect this invention relates to a method of sealing a puncture in a pneumatic tire. In one of its more specific aspects this invention relates to a tubeless tire having a self-sealing lining which will not cause imbalance in said tire.

Inner tubes and more recently tubeless tires have been equipped with a so-called self-sealing lining of a soft, tacky material incorporated into the tire or tube, which lining tends to flow into punctures or breaks in the wall or crown of the tire thereby preventing the escape of air. Such self-sealing materials are maintained at all times sufficiently fluid to flow around a penetrating object and follow the object into the puncture as the object, such as a nail or spike, is removed. These materials which are maintained fluid under all road conditions tend to flow within the tire and cause imbalance thereof under the higher temperatures encountered in summer driving. Such imbalance generally occurs while the tire is at rest following a period of extended use on warm days. Since the lining material tends to flow from some areas and accumulate in others, this flow also lowers the protective efficiency of the lining. Solutions to this problem have been advanced which involve compartmenting the lining and thus preventing flow thereof but this solution has the obvious disadvantages of increased tire fabrication expense and lack of protection against punctures in the areas covered by the compartment walls.

According to my invention a self-sealing lining is provided which has high resistance to flow under normal operating temperatures but is capable of becoming quickly a fluid, tacky, sealing material when heated above a critical temperature which can be determined by conditions of operation to which the lining is subjected. Such a lining is produced by blending a soft unvulcanized or partially vulcanized elastomer having little or no reinforcing material with a polymer of ethylene having a high degree of crystallinity, for example at least 75 percent at 25° C. as determined by nuclear magnetic resonance. A blend of this type, I have found, has excellent resistance to cold flow with a relatively sharp softening temperature, being ideal, therefore, as a lining of the type described. This lining can be incorporated into pneumatic tires or inner tubes or other articles of this type in which a self-sealing material is desired. According to my invention the lining can be heated to a sealing consistency by operating the tire at reduced pressure or with an external heating means such as a heating rod inserted in the puncture or heating means placed within the tire.

It is an object of this invention to provide a self-sealing lining for pneumatic tires, inner tubes and the like which will not cause imbalance but will offer self-sealing properties at elevated temperatures. It is another object of the invention to provide a tubeless tire having a lining which will not flow under normal operating conditions but which will become self-sealing when the tire becomes heated due to operation at reduced pressures. It is still another object to provide a method for applying external heat to such a heat-sealable lining. Other objects, advantages, and features of my invention will be apparent to those skilled in the art from the following discussion and appended claims and drawings.

Figure 1:
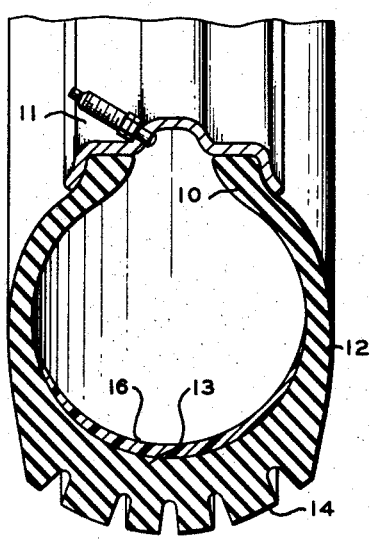
Figure 1 is a cross section of a pneumatic tire showing placement of the heat-sealable lining.

The heat-sealable linings of my invention can be applied to various types of inflatable objects and various rubber or plastic lined articles such as tanks or pipes but their greatest advantages are in the application of pneumatic inner tubes and tubeless tires since it is these articles in which the problem of cold flow of normally soft, tacky linings is present. Even so, when tanks or pipes are repaired or modified, as is commonly done in industrial applications, the affected part can be resealed with gum rubber-ethylene polymer lining so that a continuous lininge is easily maintained during subsequent service. The linings of my invention, in addition to having improved resistance to flow at temperatures encountered in normal service, have also a low permeability to air, are not readily oxidized by air and have improved resistance to solvents.

The elastomeric materials which can be used in admixture with the ethylene polymer for preparing the lining of my invention can be either a natural rubber or a synthetic elastomer or a blend of both. Suitable synthetic elastomers include homopolymers of conjugated dienes having from 4 to 8 carbon atoms per molecule, copolymers of mixtures of such conjugated dienes and copolymers of conjugated dienes with copolymerizable monomers containing the $CH_2=C<$ group. Preferred are elastomers which are copolymers of isoolefins and conjugated dienes in which the isoolefin has from 4 to 8 carbon atoms per molecule and the conjugated diene has from 4 to 6 carbon atoms per molecule. Copolymers of this type having a major amount of isoolefin and a minor amount of conjugated diene, known generally as butyl rubbers, are preferred. Examples of preferred elastomers in addition to the butyl rubbers are natural rubber, neoprene and butadiene-styrene copolymers.

The ethylene polymers which are suitable for the linings of this invention are those ethylene polymers having a crystallinity of at least 75 percent and preferably above 80 percent at 25° C. a density of at least 0.94, and a softening temperature in the range of about 240 to 270° F. The homopolymer of ethylene is preferred but generally copolymers of monomer systems can be used which monomer systems have up to 10 weight percent of the total polymerizable material selected from propylene, 1-butene, 2-butene and mixtures thereof. Higher percentages of monoolefin having from 3 to 8 carbon atoms per molecule and up to 10 weight percent of conjugated dienes such as 1,3-butadiene can be used but it is preferred to keep the molecular weight and amounts of comonomer low in order to produce a copolymer with a crystallinity, density and softening temperature as specified above.

A preferred method of making the ethylene polymer above described is by polymerizing ethylene with or without a comonomer, as specified, in the presence of a catalyst comprising chromium, a portion of which is hexavalent, as chromium oxide, associated with at least one oxide selected from the group consisting of silica, alumina, zirconia and thoria, the chromium oxide-silicaalumina catalyst being preferred for commercial operation. The total chromium content of the catalyst is preferably between 0.1 and 10 weight percent. The polymerization is ordinarily carried out at a temperature between 150 and 450° F. and a solvent is normally employed whihc is relatively inert, nondeleterious, and liquid under the reaction conditions. Suitable solvents are paraffins and/or cycloparaffins having 3 to 12 carbon atoms per molecule, such as propane, normal pentane, isopentane, issooctane, cyclohexane and methyl cyclohexane. In liquid phase reactions the pressure of the reaction must be sufficient to maintain the solvent in a liquid phase and otherwise the pressure can vary over a wide range, for example, from about 100 to 700 pounds per square inch absolute or higher. Polyethylene thus prepared is characterized by a density of at least 0.955, a crystallinity at 25° C. of at least 90 percent, and a softening temperature of about 255 to 265° F.

Preparation of such olefin polymers is more fully described in a copending application of Hogan and Banks, Serial No. 573,877, filed March 26, 1956, now U.S. Patent 2,825,721.

While the above described method is preferred for the manufacture of the ethylene polymer to be used in the lining, any process which will yield a product having the desired physical characteristics is satisfactory. For example, ethylene can be polymerized with or without comonomers of acyclic olefins in the presence of a number of catalyst systems, preferably comprising an organometal derivative as one component. Such catalyst compositions can have two or more components, one component being an organometal compound, a metal hydride or a group I, II or III metal and the other component being a compound of a group IV to VI metal. With certain of the above two component systems, an organic halide having 30 or less carbon atoms per molecule or a metal halide can be used advantageously as a third catalyst component. Salts of titanium, zirconium, thorium, uranium and chromium are exceptionally suitable. Mixtures of tetrachlorides, oxychlorides, or acetylacetonates of these metals with aluminum trialkyls rapidly convert ethylene to high molecular weight polyethylene, even at low pressures and temperatures, the reaction usually being carried out in a reaction medium comprising an aliphatic or hydroaromatic hydrocarbon such as pentane, hexane, cyclohexane, tetrahydronaphthalene, and the like. Specific examples of suitable catalyst systems are triethylaluminum and titanium tetrachloride, mixtures of ethylaluminum halides and titanium tetrachloride, titanium tetrachloride and sodium or magnesium, titanium tetrachloride with lithium aluminum hydride and ethyl bromide, tridodecylaluminum and titanium tetrachloride, triethylaluminum and zirconium acetylacetonate, triethylaluminum and tungsten hexachloride, triethylaluminum and potassium titanium hexafluoride and triisobutylaluminum with zirconium tetrabutoxide.

To prepare a gum stock for a lining material of my invention, from 2 to 30 and preferably not over 15 parts by weight of a highly crystalline ethylene polymer is mixed with 100 parts of the elastomer. These materials can be premixed by any suitable means or mixed during the customary milling operations. The elastomer should be a soft polymer having a low Mooney of about 3 or less to about 15 as measured by the standard Mooney test (ML-4). This measurement is difficult to make below about 3 but soft, tacky elastomers in this range are suitable. The milling is preferably done initially at a temperature above the melting point of the ethylene polymer for a time sufficient to form a homogeneous band on the mill. A temperature of about 260 to 340° F. is generally satisfactory. Compounding ingredients, except sulfur and accelerators, can be added to the hot mixture. It is desirable to follow the hot milling period with a cold milling period. Cold milling has been found to improve the performance of the gum stocks by giving more pliable polymers having a lower permeability to gases. During the cold milling while the mixture is below about 140° F., sulfur, accelerators, and other ingredients can be added as desired. For example, a suitable recipe is shown in Table I below for a butyl rubber-polyethylene stock containing 5 weight percent polyethylene.

Table I

| | Parts by weight |
|---|---|
| Rubber-polymer blend | 100 |
| Sulfur | 0.5 |
| Stearic acid | 1.0 |
| Captax [1] | 0.2 |
| Tuads [2] | 0.5 |
| Zinc oxide | 1.5 |

[1] Mercaptobenzothiazole.
[2] Tetramethylthiuram disulfide.

With this recipe, reinforcing agent can be added in small amounts depending upon the amount of ethylene polymer in the rubber-blend. In general, for higher concentrations of ethylene polymer it is desirable to use less reinforcing agent. The reinforcing agent can be eliminated entirely if desired. As an example, a suitable amount of reinforcing agent with the recipe of Table I is about 10 parts by weight of agent such as carbon black or clay, preferably Dixie Clay.

The temperature at which the lining becomes sufficiently fluid to have sealing properties depends upon the amount of ethylene polymer employed, the type of elastomer gum, and the curative system used. Plasticizers can be used, more especially thermoplastic resins, as desired. The Mooney value of the sealing material at sealing temperatures should be about 5(ML-4) and below. Under normal operating conditions for passenger and truck tires a lining having a Mooney value at operating temperatures of about 20 to 25 is satisfactory. These ranges are presented, of course, for exemplary purposes and it should be understood that those skilled in the art of rubber compounding and manufacture can readily supply from the teaching of my invention, the proper Mooney value and concentrations in the blend of the various materials with the proper degree of vulcanization to best suit the specific use for which the lining is to be employed.

Conventional methods can be employed for manufacturing the tubeless tire which contains the heat-sealable lining. The lining is formed by extrusion of the gum stock or by rolling it into sheets of the desired contour or by molding the stock into strips suitable for cutting, forming and incorporation into the tires or tubes. The lining can be partially vulcanized or cured prior to assembly in the tire or the vulcanization of the lining can be effected during the process of tire manufacture. The degree of vulcanization can be regulated by the amount of vulcanizing agent and curing additives compounded with the rubber-polymer blend. It is also possible and in many instances preferred to avoid vulcanization of the lining altogether. The lining can be applied to the carcass of the tire as a sheet by cementing or calendering. Addition of the sealable material to the tire in a solvent is possible but not recommended.

Figure 2:
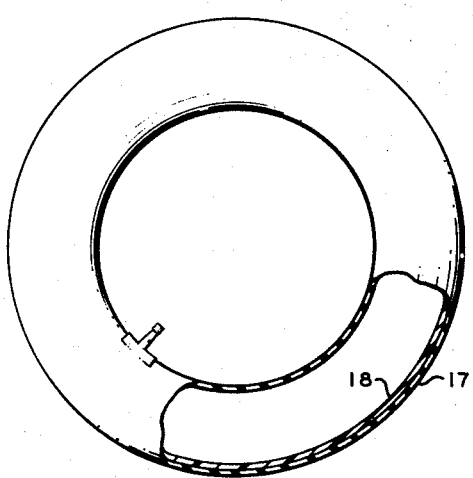
Figure 2 is a similar cut-away of an inner tube.

Truck and auto tires comprise a crown portion carrying a rubber-like tread and wall portions terminated in bead portions which support the tire against the rim of the wheel. The walls of the tire can be reinforced by plies having an embedded material such as cord fabric of cotton, rayon, nylon or the like. The sealable gum rubber liner is preferably placed on the crown region of the inner surface of the tire as a layer having a thickness of about 0.05 to 0.25 inch. This layer in turn can be covered, attached to or cemented to one or more plies of rubber-like laminates to strengthen the tire. Referring now to Figure 1, the tubeless tire having the self-sealing lining incorporated therein is shown in cross section. Bead portion 10 of the tire forms a sealed closure with rim 11. Sidewall 12 connects the bead portion 10 with crown portion 13. Tread 14 is carried by crown portion and the sealing liner 16 covers the inner surface of crown portion 14 extending up sidewalls 12. Likewise Figure 2 shows in cut-away a cross section of an inner tube having wall 17 covered on its inner surface by liner 18.

Under normal operating conditions in the summertime the tires of a passenger car attain temperatures in the range of about 120 to 180° F. Under heavy loads these temperatures may be as high as 200° F. Truck tires generally operate at higher temperatures under the same conditions of ambient temperature and in general the maximum temperature of a truck tire is about 180 to 200° F. and as high as 225° F. under heavy load. These temperatures apply when the tires are operating at prescribed pressures. Any loss of air from the tire such as would occur in the event of a puncture will result in lower pressures within the tire and considerably increased operating temperatures, the temperature in such a case at times becoming eventually sufficient to scorch and even ignite the tire body. According to my invention the tire having the lining as above described will upon slight loss of air quickly reach a temperature in excess of those normal to ordinary operating conditions. For example, the tires of a passenger car under normal operating conditions seldom exceed temperatures of about 200° F. By properly compounding the composition forming the lining of my invention it is possible to incorporate into the tire a lining which will become soft, tacky and sufficiently fluid to seal puncture holes in the tire body as soon as temperatures in the range of about 200 to 250° F. are reached. Preferably a slight safety factor can be used and a lining built which will become sealable within a narrow temperature range, for example, about 225 to 250° F. This range would be satisfactory for both truck and passenger tires but as stated previously the critical temperature of the lining, that is, the temperature at which the lining quickly becomes soft and sealable, can be readily set at any point over a broad range of about 180 to 300° F. by varying the Mooney value of the original gum rubber, the crystallinity and softening temperature of the ethylene polymer, the relative proportions of each, and the degree of cure or vulcanization imparted to the lining in its finished form within the tire or tube.

Assume now, for example, that a passenger tire such as the one illustrated in cross section by Figure 1 is operated at its prescribed pressure on a hot summer day. The maximum temperature obtained by the tire and its lining is about 200° F. At this temperature the lining has excellent resistance to flow and there is substantially no tendency for the tire to become unbalanced due to shifting of the lining within the tire. However, while being driven the tire becomes punctured and begins to lose air. Operating at a reduced pressure from that recommended, the tire and the lining quickly attain a temperature of about 225° F. This would occur rapidly even in cold weather as the heat transfer from the lining of the tire to the atmosphere and road surface is very slow. As soon as the temperature in the range of about 225 to 250° F. is reached, the lining becomes quickly soft, tacky and fluid and forms a seal around the puncturing object, such as a nail or a spike. This remedial action occurs quickly before damage can be done to the tire as a result of the puncture but sufficient air is lost to warn the motorist, by a change in driving characteristics, that the tires should be checked at the next stop.

Figure 3:
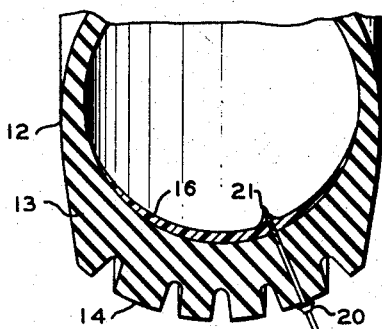
Figures 3 and 4 show a method of applying heat to a lining surrounding a puncture using an insertable heating rod.
Figure 4:
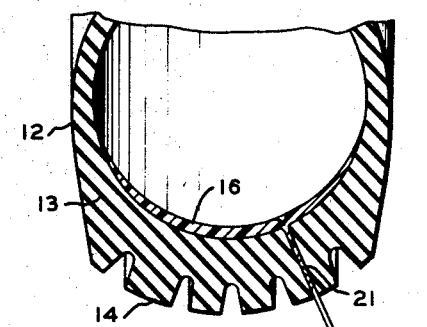

Ordinarily when a nail is withdrawn from the tire it will draw with it sufficient sealing material adhered to its point to seal the hole which it made in the tire or tube. However, should the nail not remain in the tire or the puncture not occur or be noticed while driving, a hole can be readily repaired by simply applying heat to the lining from some external source. A preferred method of doing this is illustrated by Figures 3 and 4. Figure 3 shows a heating rod having a handle 19, a shank 20 and heating point 21 which is insertable in the puncture hole and can be used to electrically heat and soften the lining material adjacent the hole, the heating rod having electrical connections 22. As the lining material softens, it flows around the point 21 of the heating rod and is pulled into the hole as the heating rod is withdrawn as shown in Figure 4.

Figure 5:
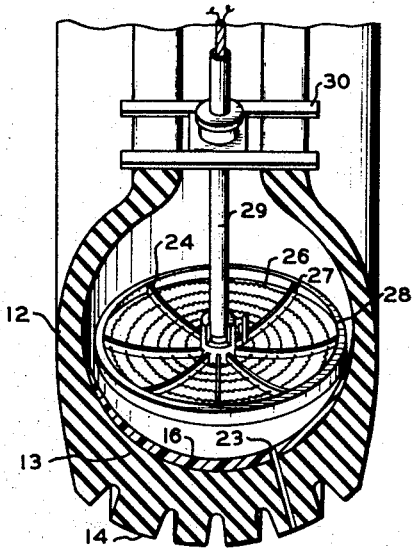
Figure 5 shows an alternate method of applying heat to the lining by internal means.

An external heating source which will soften the lining sufficiently to enable it to seal punctures can be used in repairing the tire of this invention. For example, as shown in Figure 5 an electrical heating device can be inserted in the tire which will concentrate its heat upon the lining material in the crown portion of the tire. As illustrated in Figure 5, a tire having a puncture hole 23 can be repaired without necessarily locating the exact position of the hole by inserting heating device 24 having resistance coils 26 carried by ribs 27 joined by a ring 28 and supported in the tire by shaft 29 adjustable to the desired depth from supporting bars 30. Figure 5 is merely illustrative of one of many heating devices which could readily be devised to soften the lining material in the area adjacent the puncture.

Softening temperature as used in this specification and claims is determined by a method adapted from the method of Karrer, Davis and Dieterich, Industrial and Engineering Chemistry (Analytical Edition) 2, 96, (1930). "Softness" for a polymer is determined as described in this article over a range of temperatures and plotted to form a curve showing softness increasing with temperature. The softening temperature is, by definition, the point at which the slope of the curve equals the tangent of 60 degrees.

Crystallinity is determined by nuclear magnetic resonance and critical values listed herein are determnied at 25° C. This method of polymeric crystallinity determination is discussed and described by Wilson and Pake in The Journal of Polymer Science, 10, 503, (1953).

I claim:
1. In an inflatable article of manufacture an improved self-sealing lining which comprises a blend of a major amount of soft gum rubber and a minor amount of ethylene polymer having a density of at least 0.94, a softening temperature in the range of about 240 to 270° F., and a crystallinity of at least 80 percent at 25° C., said lining having substantial resistance to flow within the normal temperature range to which said article is subjected in operation but becoming tacky and fluid when heated above said temperature range.

2. A heat-sealable tubeless tire which is not subject to imbalance due to flow of sealant within the tire but which becomes self-sealing from heat build-up when operated at pressures below normal which comprises a tire body having a bead portion, a wall portion and a crown portion carrying a thread and a soft rubber-like liner covering and adhering to the inner face of said crown portion, said liner comprising a blend of soft gum elastomer and sufficient ethylene polymer having a density of at least 0.94, a softening temperature in the range of about 240 to 270° F., and a crystallinity at 25° C. of at least 80 percent to yield a sealing rubbery composition having a relatively sharp softening point at a temperature above but near the maximum temperature of normal tire operation at prescribed pressure.

3. A heat-sealable pneumatic tube which comprises a tubular body portion of vulcanized compounded elastomer and a soft partially vulcanized elastomeric liner portion covering the inner face of said body portion, said liner portion having substantial resistance to flow under normal operating temperatures to which said tube is subjected but capable of quickly becoming tacky and sufficiently fluid to flow into small voids in said body portion when heated to a temperature somewhat above the maximum normal operating temperature and said liner portion comprising a blend of gum elastomer and ethylene polymer having a density of at least 0.94, a softening temperature in the range of about 240 to 270° F., and a crystallinity at 25° C. of at least 80 percent in sufficient amount to impart to said liner portion the above described properties for any given set of operating conditions.

4. An inflatable article of manufacture comprising a tough, flexible, resilient rubber-like body portion forming an airtight closure and a soft sealable lining covering the inner face of said body portion, said lining comprising a blend of soft, low Mooney elastomer and a highly crystalline ethylene polymer having a density of at least 0.94, a crystallinity at 25° C. of at least 80 percent and a softening temperature in the range of about 240 to 270° F., said blend having about 2 to 15 parts by weight of said ethylene polymer per 100 parts of blend, said lining having the property of high resistance to flow below a temperature in the range of about 200 to 250° F. but capable of quickly becoming a tacky, fluid sealing material when heated above said temperature in the range of about 200 to 250° F.

5. An article of claim 4 wherein said low Mooney elastomer is an isoolefin-conjugated diene copolymer wherein the isoolefin has 4 to 8 carbon atoms and the conjugated diene has 4 to 6 carbon atoms per molecule.

6. A heat-sealable pneumatic tubeless tire comprising a tire body having a bead portion, a sidewall and a crown portion carrying a tread thereon and a soft, rubber-like lining covering the inner face of said crown portion, said lining being but partially vulcanized and comprising a blend of a soft elastomer having a low Mooney of about 3 and below to about 15 and selected from the group consisting of homopolymers of conjugated dienes having from 4 to 8 carbon atoms per molecule, copolymers of mixtures of such conjugated dienes, copolymers having a major amount of conjugated diene and minor amount of copolymerizable monomer containing the $CH_2=C<$ group, and copolymers having a major amount of isoolefin and a minor amount of conjugated diene, with from 2 to 15 parts by weight per 100 parts of blend of a highly crystalline ethylene polymer formed by polymerizing a monomer system comprising ethylene and from 0 to 10 weight percent of materials selected from propylene, 1-butene, 2-butene, and mixtures thereof, in the presence of a chromium-oxide containing catalyst to produce an ethylene polymer having a density of at least 0.94, a crystallinity at 25° C. of at least 80 percent and a softening temperature in the range of about 240 to 270° F., said lining having a high resistance to flow at temperatures below a temperature in the range of about 200 to 250° F., thereby preventing imbalance in said tire due to flow of said lining at operating temperatures, but having the property of quickly becoming a tacky, fluid, self-sealing material when heated to temperatures somewhat above said temperature in the range of about 200 to 250° F., thus enabling said tire to develop self-sealing qualities when operated at slightly reduced pressures as would be produced by a puncture and subsequent loss of air.

7. A tubeless tire comprising a vulcanized rubber-like body have a reinforced wall region and a crown region with a tread thereon and partially vulcanized lining on the inner face of said crown region, said lining having a thickness of about 0.05 to 0.25 inch and comprising a blend of about 2 to 15 parts by weight of polyethylene with from about 85 to 98 parts by weight of butyl rubber gum stock, said polyethylene having been formed in the presence of a chromium oxide containing catalyst and having a density of at least 0.955, a crystalinity at 25° C. of at least 90 percent, and a softening temperature of about 255 to 265° F., said lining having substantially no tendency to flow and cause imbalance of said tire at temperatures below about 225° F. but at temperatures in the range of about 225 to 250° F. becomes a fluid, tacky, puncture sealing material.

8. A method of sealing a hole in a pneumatic tubeless tire which comprises providing said tire prior to the formation of said hole with a liner of sealing material comprising a blend of a major amount of soft elastomer and a minor amount of highly crystalline ethylene polymer characterized by a density of at least 0.94 and a crystallinity at 25° C. of at least 80 percent, and having a softening temperature in the range of about 240 to 270° F., said sealing material having substantially no tendency to flow under normal tire operating conditions but becomes tacky and fluid when heated above a critical temperature, and applying heat to the portion of said sealing material adjacent said hole thereby heating said portion above said critical temperature.

9. A method of sealing a puncture hole in a pneumatic tire suitable for operation without an inner tube which comprises equipping said tire with a lining of sealing material comprising a blend of gum rubber and ethylene polymer having a density of at least 0.94, a softening temperature in the range of about 240 to 270° F., and a crystallinity at 25° C. of at least 80 percent, said lining having high resistance to flow at temperatures below about 225° F., inserting a heatable rod into said hole to be sealed, applying heat by means of said rod to a portion of said sealing material adjacent said hole thereby raising the temperature of said portion above about 225° F., thus causing said portion to become tacky and fluid and adhere to said rod, and withdrawing said rod from said hole, thereby pulling sealing material into said hole.

References Cited in the file of this patent

UNITED STATES PATENTS

| 1,339,736 | Burke | May 11, 1920 |
| 2,566,384 | Tilton | Sept. 4, 1951 |
| 2,692,259 | Peters | Oct. 19, 1954 |
| 2,734,039 | Peterson et al. | Feb. 7, 1956 |
| 2,802,505 | Peterson et al. | Aug. 13, 1957 |

OTHER REFERENCES

Vinyl and Related Polymers, by Calvin E. Schildknecht, published by John Wiley and Sons, N.Y., copyright 1952, page 512.